United States Patent [19]

Greivenkamp, Jr. et al.

[11] Patent Number: 5,075,562

[45] Date of Patent: Dec. 24, 1991

[54] METHOD AND APPARATUS FOR ABSOLUTE MOIRE DISTANCE MEASUREMENTS USING A GRATING PRINTED ON OR ATTACHED TO A SURFACE

[75] Inventors: John E. Greivenkamp, Jr.; Russell J. Palum, both of Rochester, N.Y.; Kevin G. Sullivan, Ft. Myers, Fla.

[73] Assignee: Eastman Kodak Company, Rochester, N.Y.

[21] Appl. No.: 584,983

[22] Filed: Sep. 20, 1990

[51] Int. Cl.⁵ .............................. G01V 9/04
[52] U.S. Cl. ...................... 250/561; 356/374; 250/237 G
[58] Field of Search ............ 250/561, 560, 237 G, 250/201.7; 356/1, 4, 356, 401, 374, 376

[56] References Cited

U.S. PATENT DOCUMENTS 2,867,149  1/1959  Goddard .
2,977,847  4/1961  Meyer-Arendt .

(List continued on next page.)

FOREIGN PATENT DOCUMENTS 7737103   7/1979   France .
98634    12/1980   German Democratic Rep. .
56-75004  6/1981   Japan .
58-34309  2/1983   Japan .
58-35406  3/1983   Japan .
58-115313 7/1983   Japan .
58-169012 10/1983  Japan .
58-206908 12/1983  Japan .
59-23205  2/1984   Japan .
61-169702 1/1985   Japan .
60-257306 12/1985  Japan .

OTHER PUBLICATIONS

T. K. Dehmel in *Instruments and Control Systems*, vol. 39, No. 6, Jun. 1966, pp. 123-124.

T. K. Dehmel in *SPIE Journal*, vol. 5, Feb.-Mar. 1967, pp. 91-94.

R. S. Schools et al. in the *IBM Technical Disclosure Bulletin*, vol. 10, No. 3, Aug. 1967, pp. 278-279.

R. W. Harrison in the *IBM Technical Disclosure Bulletin*, vol. 12, No. 10, Mar. 1970, p. 1643.

C. H. Hammond et al. in the *IBM Technical Disclosure Bulletin*, vol. 14, No. 1, Jun. 1971, pp. 49-50.

H. Takasaki in *Proceedings of the 12th Int'l Congress on High Speed Photography*, Toronto, 1-7 Aug. 1976, pp. 30-36.

C. H. Herman et al. in the *Western Electric Technical Digest*, No. 44, Oct. 1976, pp. 27 ∝ 28.

O. Kafri et al. in *Applied Optics*, vol. 20, No. 18, Sep. 15, 1981, pp. 3098-3100.

K. Creath et al. in *Optica Acta*, vol. 32, No. 12, 1985, pp. 1455-1464.

*Primary Examiner*—David C. Nelms
*Assistant Examiner*—Que T. Le
*Attorney, Agent, or Firm*—Charles E. Snee, III

[57] ABSTRACT

Method and apparatus are disclosed for providing absolute Moire distance measurements of a diffusely reflective surface from a reference position. More particularly, a first grating is located, formed, or printed on the diffusely reflective surface. An image of the first grating is formed on a second grating or detector array by imaging means for generating a Moire pattern that is detected by a detector means. At the reference position of the diffusely reflective surface relative to the imaging means, the periods of the image of the first grating and the second grating match. Movement of the diffusely reflective surface from the reference position in a direction normal thereto, produces a spatially varying intensity pattern at the detector means which results from the shifting and magnification mismatch between the pattern of the image of the first grating and the pattern of the second grating. Measuring the amount of magnification differences between the two patterns provides information related to the instantaneous absolute distance of the diffusely reflective surface from the reference position. Various methods are disclosed for using the information from the detector means for determining the absolute distance measurements.

30 Claims, 9 Drawing Sheets

U.S. PATENT DOCUMENTS

| | | |
|---|---|---|
| 3,166,624 | 1/1965 | Vargady . |
| 3,206,606 | 9/1965 | Burgo et al. . |
| 3,245,307 | 4/1966 | de Lang . |
| 3,330,961 | 7/1967 | Juengst et al. . |
| 3,427,109 | 2/1969 | Beattie et al. . |
| 3,572,942 | 3/1971 | Te Kronnie et al. . |
| 3,589,817 | 6/1971 | Sugaya . |
| 3,604,813 | 9/1971 | Te Kronnie et al. . |
| 3,663,107 | 5/1972 | Denis et al. . |
| 3,674,372 | 7/1972 | Weyrauch . |
| 3,759,618 | 9/1973 | Rogers et al. . |
| 3,796,498 | 3/1974 | Post .................................. 250/237 G |
| 3,815,998 | 6/1974 | Tietze . |
| 3,847,484 | 11/1974 | Gropper et al. . |
| 4,044,377 | 8/1977 | Bowerman . |
| 4,051,483 | 9/1977 | Suzuki . |
| 4,079,252 | 3/1978 | Brake .................................. 250/237 |
| 4,102,578 | 7/1978 | Suzuki et al. . |
| 4,125,025 | 11/1978 | Suzuki et al. . |
| 4,139,291 | 2/1979 | Frosch et al. . |
| 4,202,630 | 5/1980 | Suzuki et al. . |
| 4,212,073 | 7/1980 | Balasubramanian . |
| 4,226,538 | 10/1980 | Van Beeck . |
| 4,272,196 | 6/1981 | Indebetouw . |
| 4,459,027 | 7/1984 | Kafri et al. . |
| 4,488,172 | 12/1984 | Hutchin . |
| 4,499,492 | 2/1985 | Hutchin . |
| 4,525,858 | 6/1985 | Cline et al. . |
| 4,553,839 | 11/1985 | Kafri et al. . |
| 4,577,940 | 3/1986 | Krasinski et al. . |
| 4,614,864 | 9/1986 | Wu . |
| 4,619,527 | 10/1986 | Leuenberger et al. . |
| 4,672,564 | 6/1987 | Egli et al. . |
| 4,673,817 | 6/1987 | Oomen . |
| 4,722,600 | 2/1988 | Chiang . |
| 4,722,605 | 2/1988 | Lavnat et al. . |
| 4,776,698 | 10/1988 | Crosdale . |
| 4,794,550 | 12/1988 | Greivenkamp . |
| 4,796,200 | 1/1989 | Prior . |
| 4,802,759 | 2/1989 | Matsumoto et al. ............... 356/376 |
| 4,810,895 | 3/1989 | Kafri et al. . |
| 4,867,570 | 9/1989 | Sorimachi et al. . |
| 4,988,886 | 1/1991 | Palum et al. ....................... 250/561 |

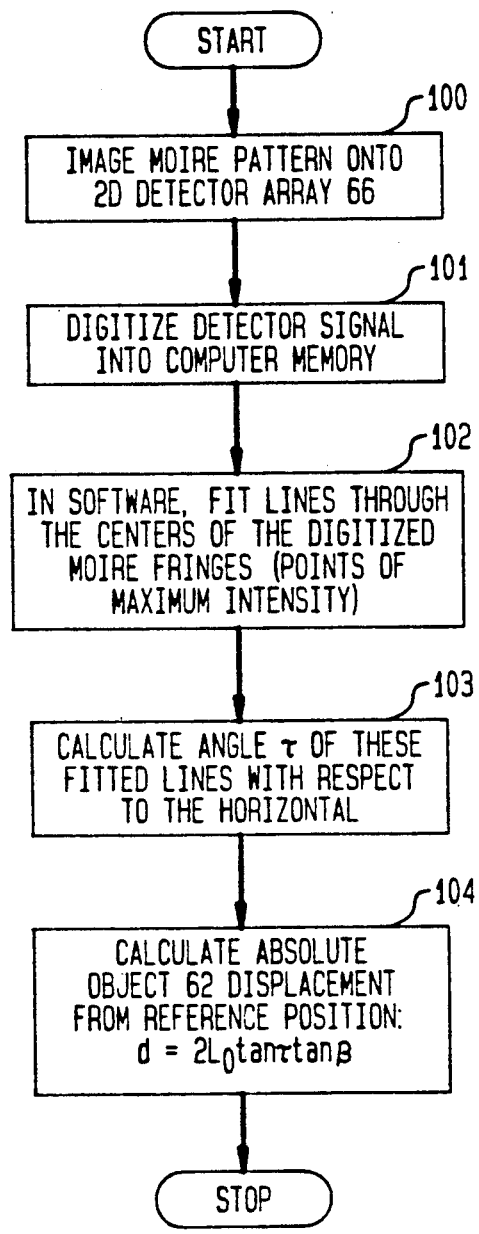

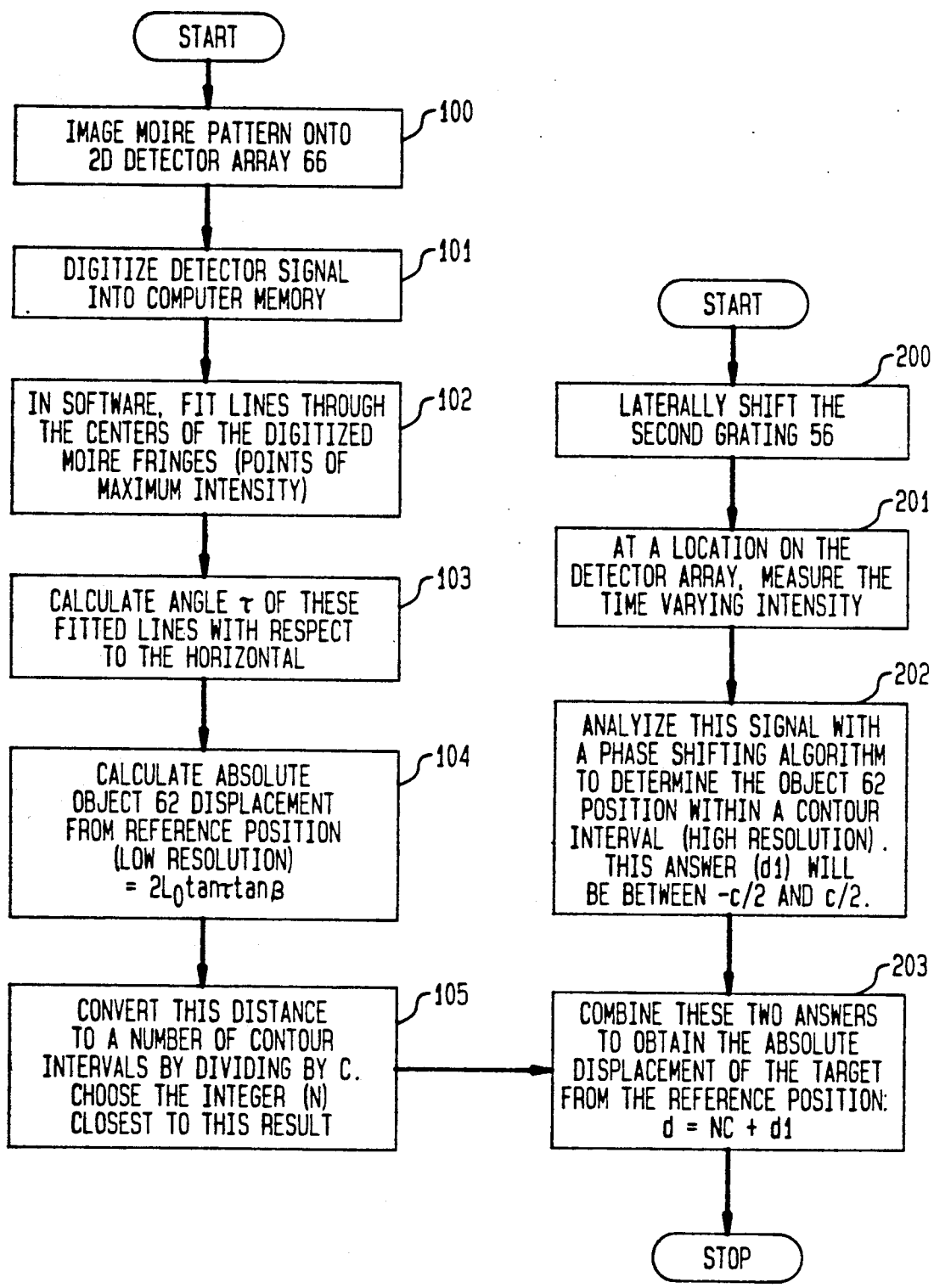

METHOD AND APPARATUS FOR ABSOLUTE MOIRE DISTANCE MEASUREMENTS USING A GRATING PRINTED ON OR ATTACHED TO A SURFACE

FIELD OF THE INVENTION

The present invention relates to a method and apparatus for providing absolute Moire distance measurements of a diffusely reflective surface of an object or support.

BACKGROUND OF THE INVENTION

Optically examining a surface with specular or diffuse reflection for defects during, or immediately after, a manufacturing process has included many different techniques. For example, U.S. Pat. No. 2,867,149 (issued to C. T. Goddard on Jan. 6, 1959) describes a first technique which uses a grating of fine wires, or ruled lines, positioned at an angle to a surface to be measured or examined. Parallel rays of light are then projected through the grating to impinge the surface at an acute angle. When viewed from directly above the surface, the shadows of the grating elements are straight for flat surfaces and non-straight for any deviation in height of the surface. Such technique might be termed a "Zebra" test because of the pattern of light and dark areas generated on the surface. Such technique is capable of seeing surface features of a predetermined minimal size depending on the period (spacing) of the lines of the grating.

A second technique is the well-known Ronchi test, wherein light from a light source is projected through a grating onto a curved reflective surface (e.g., a mirror) under test. The grating comprises alternating opaque and non-opaque parallel areas, and is imaged on itself. An observer images the optical curved surface under test through the grating. Therefore, in a normal Ronchi test, there is literally one grating, and both the light source and the viewing means or eye forming the observer are closely spaced and look through the single grating. In this regard, see, for example, a modified Ronchi test arrangement for measuring a flat surface described by R. W. Harrison in the *IBM Technical Disclosure Bulletin*, Vol. 12, No. 10, March 1970 at page 1643. In the Harrison arrangement, two lenses are needed to make up for the loss of the curved surface used in the classical Ronchi test.

U.S. Pat. No. 4,810,895 (issued to O. Kafri et al. on Mar. 7, 1989) discloses a third technique for optically examining the surface of an object using Moire ray deflection mapping. With this Moire ray deflection mapping arrangement, light reflected from the surface of an object to be measured is collimated and directed through a first and a second closely spaced grating. The gratings are located at a preselected angular orientation with respect to each other to produce a Moire fringe pattern that provides an indication of the properties of the examined surface. In Moire techniques, the detector (observer or camera) is generally located immediately behind the second grating, or at the image of the first grating on the second grating. For other Moire grating arrangements see, for example, U.S. Pat. No. 3,166,624 (issued to L. O. Vargady on Jan. 19, 1965); and U.S. Pat. Nos. 3,572,924 and 3,604,813 (issued to G. H. Te Kronnie et al. on Mar. 30, 1971 and Sept. 14, 1971, respectively).

Moire techniques are also used to detect a distance or displacement of a surface. Such Moire distance measuring techniques can be used for surface contour measurements or for positioning the surface of an object relative to another object or surface. For example, U.S. Pat. No. 4,733,605 (issued to Livnat et al. on Feb. 2, 1988) discloses a Moire distance measurement method and apparatus useful for the non-contact measurement of small displacements of a specularly reflective surface with a high degree of accuracy. The technique described by Livnat et al. involves projecting a collimated beam of light through a first grating onto the specularly reflective surface. The light reflected by the surface is modulated by a second grating rotated at an angle $\Theta$ with respect to the first grating to form a Moire pattern which can be used to determine distance. A displacement of the surface causes the Moire pattern to shift, and this shift in the Moire pattern is detected and used to measure the distance moved by the surface.

In general, Moire distance measuring techniques usually require a distance measurement obtained by counting the number of times a measured intensity in a Moire pattern behind a viewing grating goes through a periodic change. This gives the distance in contour intervals from an initial position, where a contour interval is a change of detected intensity at a point in the Moire pattern which goes through a full period (i.e., bright to dark to bright). The information about the position of the surface being measured is lost, however, if the count of the number of contour intervals is lost or wrong.

It is desirable to have a Moire distance measurement technique which does not require the counting of contour intervals to make a Moire distance measurement.

SUMMARY OF THE INVENTION

The present invention is directed to method and apparatus for providing an absolute Moire distance measurement. More particularly, the method of providing absolute Moire distance measurements comprises the steps of: (a) locating, forming, or printing a first grating on a diffusely reflective surface to be measured; (b) forming an image of the first grating on a second grating with an imaging means for generating a Moire pattern formed by the product of a pattern of the image of the first grating and a pattern of the second grating; and (c) detecting a difference in magnification between the pattern of the image of the first grating and the pattern of the second grating as the diffusely reflective surface moves normal to the plane thereof for generating information related to the absolute distance of the diffusely reflective surface from a reference position.

The Moire distance measurement apparatus comprises a first grating, a second grating, imaging means, optical detecting means and information generating means. The first grating is located, formed, or printed on a diffusely reflective surface to be measured. The imaging means is used to form an image of the first grating on the second grating in order to generate a Moire pattern which is formed by the product of a first pattern of the image of the first grating and a second pattern of the second grating. The optical detecting means detects a difference in magnification between the first pattern of the image of the first grating and the second pattern of the second grating of the Moire pattern as the diffusely reflective surface moves normal to the plane thereof. The optical detecting means also generates an output signal representative of such difference in magnification. Information generating means is responsive to the output signal from the optical detecting means for generating information related to the absolute distance of the diffusely reflective surface from a reference position.

The invention will be better understood from the following more detailed description taken with the accompanying drawings and claims.

BRIEF DESCRIPTION OF THE DRAWINGS

FIG. 8 is a flow diagram for the signal processing system of FIG. 7 relating to the sequence for a second detection implementation for determining the absolute displacement of the object or support; and FIG. 9 is a flow diagram for the signal processing system of FIG. 7 relating to the sequence for a fourth detection implementation for determining the absolute displacement of the object or support.

The drawings are not necessarily to scale.

DETAILED DESCRIPTION

Figure 1:
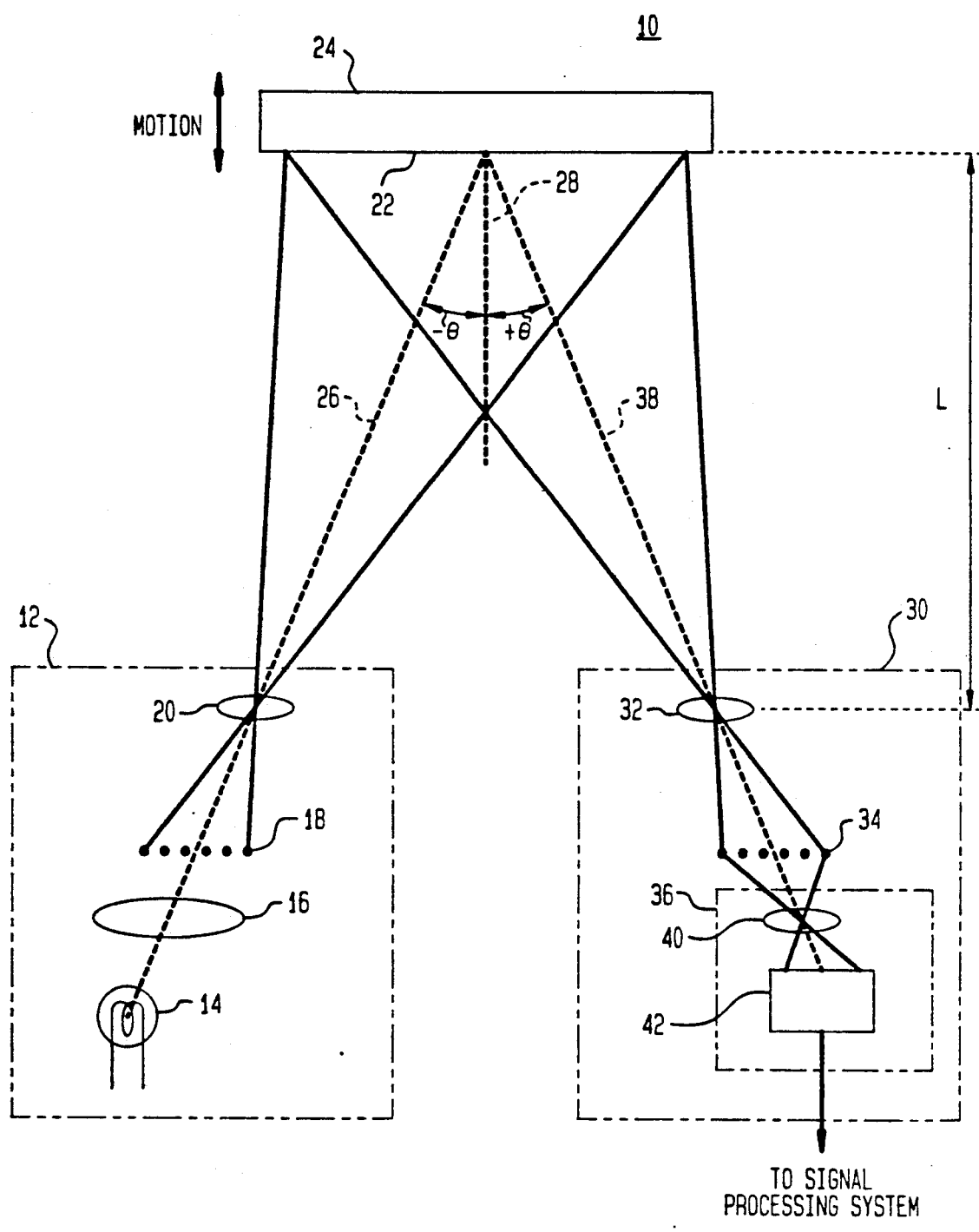
FIG. 1 is a top view of an exemplary prior art arrangement for the Moire distance measurement of a diffusely reflective surface of an object or support using a projection grating.

Referring now to FIG. 1, there is shown a top view of a Moire distance measurement system 10 using a projection grating 18 as disclosed in U.S. patent application Ser. No. 334,421 (having a common assignee and inventors and having been filed on Apr. 5, 1989). The system 10 comprises a first optical system 12 (shown within a dashed line rectangle), and a second optical system 30 (shown within a dashed line rectangle) which are used for Moire distance measurements of a diffusely reflective surface 22 of an object or support 24.

The first optical system 12 comprises a light source 14, a condenser lens 16, a first grating 18, and a projection lens 20. The light source 14 projects a beam of light through the condenser lens 16, the first grating 18, and the projection lens 20. The projection lens 20 is used to form an image (not shown) of the first grating 18 onto the diffusely reflective surface 22 of the object or support 24. An optical axis 26 of the projection lens 20 is arranged at an angle $-\Theta$ from a line 28 normal to the diffusely reflective surface 22. The first grating 20 may comprise, for example, a Ronchi ruling including a plurality of parallel wires or opaque lines with a period "P" therebetween.

The second optical system 30 comprises an imaging means 32 (hereinafter referred to as viewing lens 32), a second grating 34 and detector means 36. Viewing lens 32 is positioned at a preselected distance "L" (an initial position) from the diffusely reflective surface 22 so as to facilitate reimaging of the projected image of the first grating 18, as found on the diffusely reflective surface 22, onto the second grating 34. System 10 is useful to for accurately measuring changes in position as object or support 24 is moved. The viewing lens 32 comprises an optical axis 38 arranged at the angle $+\Theta$ with respect to the line 28. The combination of (1) the image at the second grating 34 of the projected image of the first grating 18 from the diffusely reflective surface 22, and (2) the second grating 34 itself, form a Moire pattern (not shown). The resulting Moire pattern is imaged and received by the detector means 36. Detector means 36 comprises a lens 40 which focuses the Moire pattern onto a linear or area array 42 of optical sensing elements. Alternatively, detector means 36 can comprise any suitable device such as a human eye, a photodetector, or a video camera. The changes in the Moire pattern found in the output signal from detector means 36, as the diffusely reflective surface 22 moves in a direction parallel to the line 28, can be processed by any suitable processing system (not shown).

Several methods may be employed to detect the changing Moire pattern. In accordance with a first method, the image of the first grating 18 is reimaged onto the second grating 34 by viewing lens 32. The reimage of the image of the first grating 18 onto the second grating 34 and the second grating 34 itself are congruent (i.e., have the same period and are aligned in parallel). The resulting Moire pattern is a uniform field that changes from bright to dark to bright (i.e., shift by one fringe period) forming one contour interval "C", as the diffusely reflective surface 22 moves a predetermined distance in a direction parallel to line 28.

Deriving the relationship between the contour interval "C" and the system geometry is straight forward. The diffusely reflective surface 20 has moved one contour interval "C" when the image of the projected first grating 18 is displaced relative to the second grating 36 by the period of the gratings 18 and 34. The period $P_0$ of the projected image of the first grating 18 on the diffusely reflective surface 22 is defined by the equation $$P_0 = mP \quad (1)$$

where, P is the period of first grating 18, and m is the optical magnification defined by the equation $$m = (L-f)/f \quad (2)$$

where, L is the distance from diffusely reflective surface 22 to lens 20, and f is the focal length of lens 20.

The image of the projected first grating 18, found on diffusely reflective surface 22, is reimaged by the second lens 32 onto the second grating 34 which also has a period P. The reimage of the image of the first grating 18 and the second grating 34 itself are superimposed so that the transmitted light pattern seen by detector means 36 is the product (generally denoted as the Moire) of the two gratings. With the first and second grating lines being parallel, this transmitted light pattern seen by the detector means 36 is of uniform average intensity.

When aligned, the two grating patterns overlap and thus appear as one, and the average intensity is one half of the intensity that would be measured if there were no gratings in the system. More particularly, the transmission through a single grating is assumed to be one-half intensity since the grating lines block one half of the light, and it is also assumed that the individual grating lines are not resolved by the detector means 36. When the two grating patterns have a relative shift of a half period, the bright areas of the image of the projected first grating 18 from the diffusely reflective surface 22 are shifted and blocked by the lines of the second grating 34, and the detected intensity at the detector means 36 is zero. Therefore, as one grating is laterally shifted relative to the other by the movement of the diffusely reflective surface 22 in a particular direction, the transmitted average intensity seen by the detector means 36 varies periodically from a maximum intensity to a zero intensity and back again.

More particularly, as the diffusely reflective surface 22 moves in a first and then in a second opposing direction parallel to line 28, the image of the projected grating on surface 22 will appear to shift from side to side because this pattern will remain centered on the optical axis 26 of the projection lens 20. This shift is due to the obliquity built into the arrangement 10 by placing the first optical system 12 at an angle $\Theta$ with respect to the translation direction of the diffusely reflective surface 22. The shift "s" is defined by the equation $$s = d \tan(\Theta) \quad (3)$$

where d is the displacement of the diffusely reflective surface 22 parallel to the line 28.

Even though the Moire pattern seen by the detector means 36 is formed by the superposition of the reimage of the projected image of the first grating 18 on the second grating 34, it is easier to visualize that the Moire pattern is formed on the diffusely reflective surface 22. With such visualization, the symmetry of the system 10 of FIG. 1 calls for a second grating 34 with the same period P as that of the first grating 18. An image of the second grating 34 on the diffusely reflective surface 22 then has the same period, but an opposite directional shift, as the image of the first grating 18 when the diffusely reflective surface 22 moves parallel to line 28. One contour interval "C" is deemed to be the movement of the reflective surface 22 required to shift the two grating images relative to each other by one period, $P_0$ (i.e., bright to dark to bright). For a displacement of a contour interval C, each grating image will shift in its opposing direction by $P_0/2$ and, therefore, $$P_0/2 = C \tan(\Theta), \text{ or } C = P_0/(2 \tan \Theta) \quad (4)$$

It is to be understood that FIG. 1 shows the system 10 being symmetrical about the line 28 for purposes of simplicity of description, but the above results could also be accomplished with non-symmetric arrangements or with two gratings tilted relative to each other. With any of the non-symmetric arrangements, each arrangement will have a contour interval C specific to that arrangement. Then, by counting the number of cycles of intensity change in the Moire pattern with, for example, a photocell, the distance, in terms of contour intervals, that the diffusely reflective surface 22 has translated can be determined. The physical displacement can then be obtained through the conversion in Equation (4) using any suitable processing system.

Figure 2:
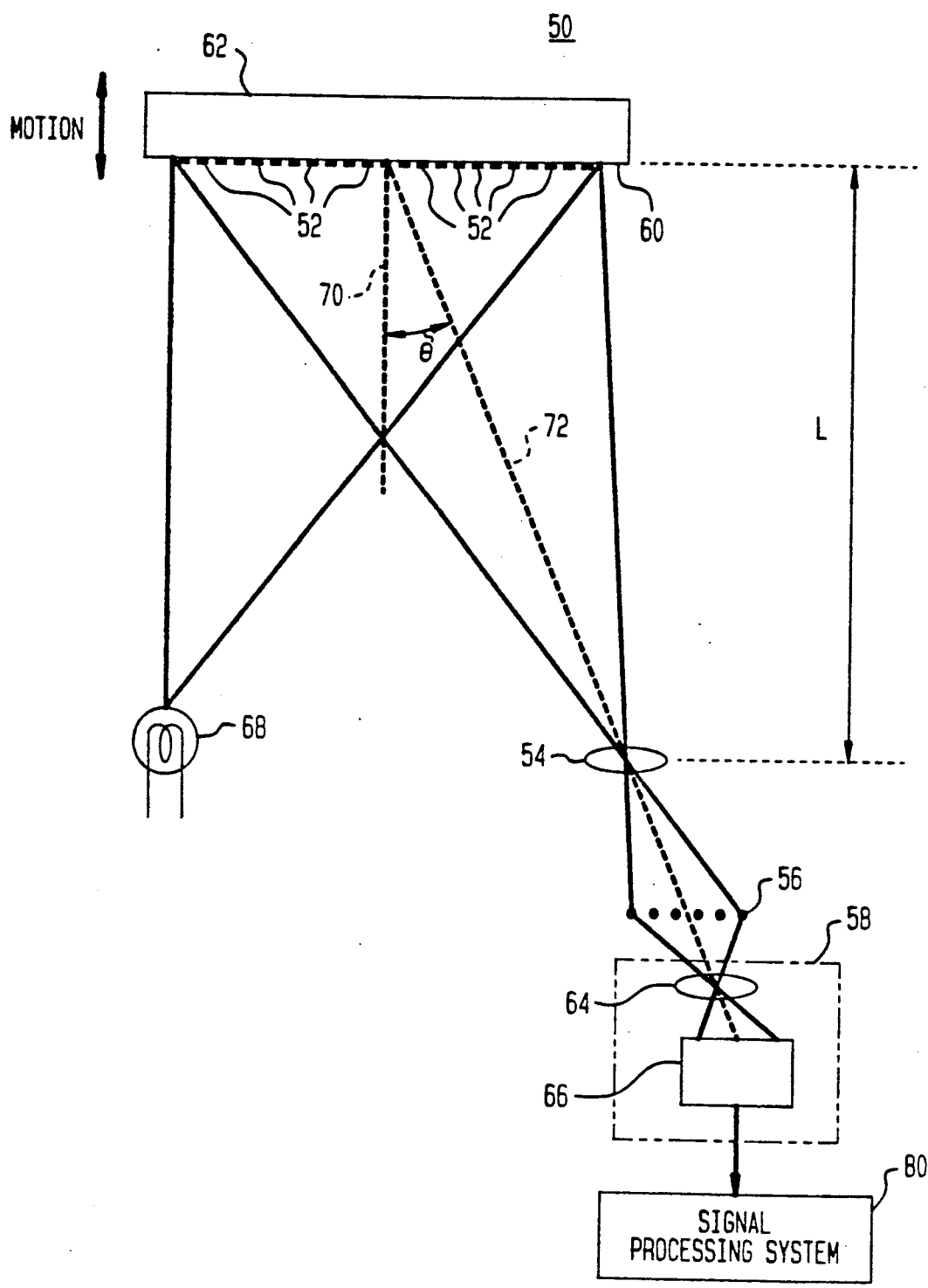
FIG. 2 is a top view of an arrangement for the Moire distance measurement of a diffusely reflective surface using a grating which is printed or located on the diffusely reflective surface.

Referring now to FIG. 2, there is shown a Moire distance measurement system 50 which is modified in accordance with the present invention for use in providing absolute Moire distance measurements as will be described hereinafter relative to FIG. 7. System 50 comprises a first grating 52, an imaging means 54 (hereinafter referred to as lens 54), a second grating 56, a detector means 58, and a signal processing means 80. The first grating 52 has a predetermined period $P_0$ and is printed on, or physically attached to, a diffusely reflective surface 60 of an object or support 62. An image of the first grating 52 is formed by the lens 54 on the second grating 56. The lens 54 comprises an optical axis 72 arranged at the angle $\Theta$ with respect to the line 70 normal to the diffusely reflective surface 60. The combination of the image of the first grating 52 and the second grating 56 itself forms a Moire pattern. This Moire pattern is imaged onto the detector means 58. The detector means 58 comprises a lens 64 which focuses the Moire pattern onto a linear or area array 66 of optical sensing elements. Alternatively, detector means 58 can comprise any suitable device such as a human eye, a photocell, or a video camera.

Essentially, the combination of the lens 54, the second grating 56, and detector means 58 are similar to the elements of the second optical system 30 of FIG. 1 The major difference between system 50 of FIG. 2 and system 10 of FIG. 1 is that the first optical system 12 of FIG. 1 is essentially eliminated, and a first grating 52 with a period $P_0$ has been placed on the diffusely reflective surface 60 and illuminated by a light source 68. Accordingly, system 50 has fewer components than system 10 of FIG. 1. It is to be understood, that the light source 68 in FIG. 2 is an unstructured light source (e.g., a light bulb) which can be placed anywhere to provide enough light to image the Moire pattern on the detector means 58. It is to be understood that for purposes of description hereinafter, the period $P_0$ of the first grating 52 in FIG. 2 is assumed to be the same as the period $P_0$ of the image of the first grating 18 on diffusely reflective surface 22 in FIG. 1 as shown in Equation (1).

To a first order, the system 50 of FIG. 2, with the printed or physically attached first grating 52, functions very similar to the system 10 of FIG. 1. As the object or support 62 translates parallel to the line 70, the intensity (or the Moire pattern) received by the detector means 58 varies periodically, and changes once per contour interval. However, without a first optical system 12 as found in FIG. 1, there is no obliquity in the arrangement of FIG. 2, and the expression for C differs by a factor of 2 from that of equation (4) and is defined as:

$$C = P_0/(\tan \Theta). \quad (5)$$

The major difference between the operation of the arrangements 10 and 50 of FIGS. 1 and 2, respectively, has to do with magnification and magnification changes. More particularly, in the system 10 of FIG. 1, as the distance L of the diffusely reflective surface 22 changes in a direction parallel to the line 28, the period $P_0$ of the pattern of the image of the first grating 18, found on the diffusely reflective surface 22, changes due to the magnification change caused by lens 20. In this regard see Equation (2). However, this change in magnification by lens 18 is compensated for by the lens 32 in the second optical system 30 which introduces an equal and opposite magnification change. Therefore, the period of the grating pattern imaged from the diffusely reflective surface 22 onto the second grating 34 remains constant, and remains matched to the period of the second grating 34. As a result, the matched gratings remain matched as the diffusely reflective surface 22 of the object or support 24 translates, and the grating images at the detector means 36 uniformly shift relative to each other over the entire Moire pattern.

With the system 50 of FIG. 2, however, this compensation in magnification change does not take place since there is only one optical system, namely the equivalent of second optical system 30 of FIG. 1 with the printed grating 52 on the diffusely reflective surface 60. Therefore, as the diffusely reflective surface 60 translates parallel to the line 70, a magnification mismatch occurs between the two grating patterns at second grating 56. The magnification mismatch manifests itself as a spatially varying intensity pattern caused by the Moire between a first and second grating pattern of different periods that is seen by the detector means 58. A low spatial frequency beat pattern, generated by the different periods, has a period that decreases as the mismatch between the gratings increases, and for no mismatch, the beat period is infinite. Therefore, at the initial position for the Moire distance measurement, there is no beat pattern where the gratings patterns at second grating 56 match. As the object or support 62 moves away from this initial position, the beat frequency of the resulting Moire pattern increases.

When the diffusely reflective surface 60 translates in a direction parallel to the line 70, the beat pattern also appears to move across the image seen by the detector means 58, so that over a small area of the Moire pattern the needed periodic change in intensity still occurs to encode the amount of translation of the diffusely reflective surface 60. One way to view this magnification change for the system 50 of FIG. 2 is that the contour interval C varies across the field of view of the lens 54 (corresponding to different points on the second grating 56), and that for each location the contour interval C is constant.

Figure 3:
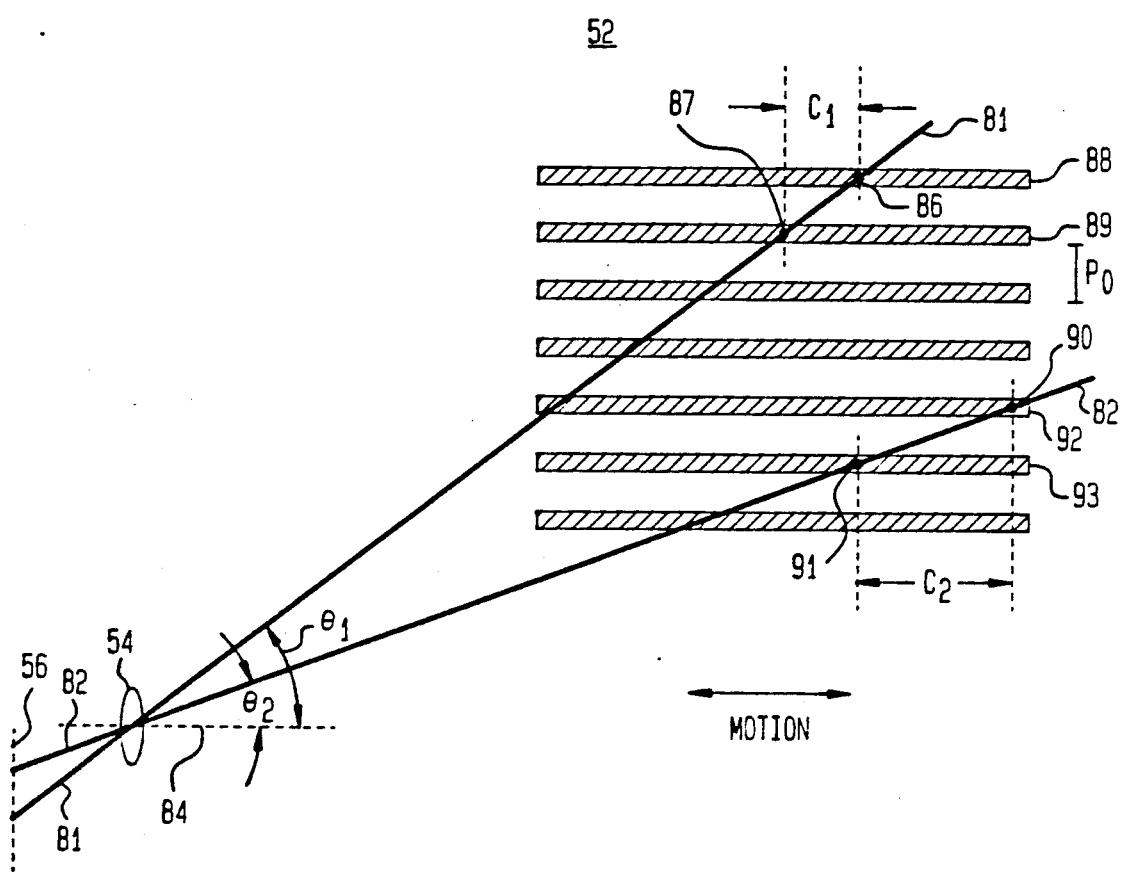
FIG. 3 is a diagram for explaining the variation of the contour interval relative to viewing angle occurring within the arrangement of FIG. 2.

Referring now to FIG. 3, there is shown a diagram related to FIG. 2 comprising a plurality of parallel dashed rectangular areas (four of which are shown with the designations 88, 89, 92 and 93) associated with the first grating 52 as will be explained hereinbelow, the lens 54 with an axis 84, the second grating 56, and first and second light rays 81 and 82, respectively, which are oriented at different respective viewing angles $\Theta_1$ and $\Theta_2$ from the second grating 56 to the dashed rectangular areas. FIG. 3 is useful to explain the variation in contour intervals relative to the viewing angles, and provides an understanding of the above statement for having a constant contour interval at each location. In FIG. 3, the dashed horizontal rectangular areas are not actual grating lines. Rather, these dashed rectangular areas represent the volumes of space that are swept out by the lines on the first grating 52 as the diffusely reflective surface 60 of FIG. 2 translates (moves from one position to another). These rectangular areas maintain a fixed period or spacing $P_0$ corresponding to that of the first grating 52.

The first and second lines labeled 81 and 82, respectively, at the respective angles $\Theta_1$ and $\Theta_2$ from the axis 84 of lens 54, represent optical rays from different part of the field of view of the lens 54. It should be noted that both of lines 81 and 82 go through the center of the lens 54 (or more accurately the center of the entrance pupil) and start at different locations on the second grating 56. These rays may also be interpreted as defining the fields of view of the elements of the optical sensing array 66 of the detector means 58 of FIG. 2 to record the intensity measurements at each location.

The contour interval C for each of these rays, or detector means sensing elements, is found by determining the distance in the z-axis direction (parallel to the translation direction of the diffusely reflective surface 60) between intersections of a given ray and the centers of adjacent volumes of space of the grating lines of first grating 52. For example, the distance between the intersection of ray 81 and each of the centers 86 and 87 of adjacent dashed volumes of space 88 and 89, respectively, is labeled $C_1$. Similarly, the distance between the intersection of ray 82 and the centers 90 and 91 of adjacent volumes of space 92 and 93 is labeled $C_2$. It is important to note that when the diffusely reflective surface 60 of FIG. 2 translates a predetermined distance $C_1$, ray 81 moves between the centers of the adjacent volumes of space 88 and 89.

More particularly, if the diffusely reflective surface 60, with first grating 52 thereon, starts in a position where its intersection with ray 81 occurs at a point 86 of volume 88, a translation of a distance $C_1$ towards lens 54 will change the intersection of ray 81 with surface 60 from point 86 of volume 88 to point 87 of volume 89. Similarly, when the diffusely reflective surface 60, with first grating 52 thereon, translates a predetermined distance $C_2$ towards lens 54, the intersection of ray 82 with surface 60 will change from point 90 in volume 92 to point 91 in volume 93. This construction shows that the Moire pattern will change from light to dark to light as it traverses between adjacent lines on first grating 52. The contour intervals for rays 81 and 82 are, therefore, different and are equal to the distances $C_1$ and $C_2$, respectively. The contour intervals $C_1$ and $C_2$ are defined by the relationships:

$$C_1 = P_0/(\tan \Theta_1); \text{ and } C_2 = P_0/(\tan \Theta_2). \tag{6}$$

It is important to note that the equations for the contour intervals $C_1$ and $C_2$ use Equation (5) evaluated at two different angles, and this result simply reflects the fact that the viewing angle $\Theta$ varies across the diffusely reflective surface 60 of the object or support 62 of FIG. 2. These separate contour intervals $C_1$ and $C_2$ are also constant, as the same result is obtained anywhere along each of the rays 81 and 82 between adjacent volumes of space indicated by the dashed lines of FIG. 3. The system 50 of FIG. 2 can, therefore, be interpreted to obtain a Moire distance measurement by applying the contour interval appropriate for a given location on the array 66 of the detector means 56. To convert the number of contour intervals to a translation distance of the object or support 62, the value of the contour interval as shown in Equation (6) is needed. Since this value of the contour interval depends on several factors such as detector location, a solution is to experimentally calibrate the system 50 of FIG. 2. For calibration purposes, the system 50 is set up with known dimensions, and the object or support 62 (with diffusely reflective surface 60 and first grating 52) is translated a known distance parallel to the line 70. The resultant measurement indicates a certain number of contour intervals. Then, by dividing the known distance by the measured number of contour intervals, the value of the contour interval for the setup of arrangement 50 is obtained.

The following discussion is presented for providing an understanding of what is happening in the Moire pattern produced by system 50. When the diffusely reflective surface 60 is located at the initial distance L, the image of first grating 52 is superimposed on, and matches the period P of, the second grating 56 by lens 54. Therefore, the resulting Moire pattern appears as uniformly spaced alternating bright and dark lines having a period P when the lines of the image of the first grating are aligned with the lines of the second grating 56. As the diffusely reflective surface 60 translates from this initial position in a first direction parallel to line 70, not only does the image of the first grating 52 shift to one side relative to second grating 56, but the image of the first grating 52 also concurrently changes in size because of the change in the magnification factor. The result is that at the center of the pattern a bright-dark-bright change will be seen, while as one goes towards the edges of the Moire pattern these bright-dark-bright changes will go out of phase at different rates as indicated by the changing contour interval relative to viewing angle in FIG. 3.

Any suitable detection technique can be used to convert intensity information into a distance measured in contour intervals. A first such detection technique is to count the number of contour intervals (periods of intensity variation) measured using a detector means 58 comprising a small photodetector located at a preselected position behind the second grating 56. This simple detection technique, however, does not provide information related to the directional movement of the diffusely reflective surface 60, and fractional contour interval information is only inferred from the intensity values detected by the photodetector.

A second detection technique is to view a larger section of the image passing through the second grating 56 using detector means 58 which comprises either a linear detector array 66 oriented perpendicular to the grating lines, or an area array 66. Since the contour intervals vary across the field of view, the intensity information should only be analyzed over a small area for counting the number of contour intervals that have passed (as in the first detection technique above). However, the entire array is used to monitor the motion of a beat pattern across the Moire pattern, and thereby infer the direction of motion. The in or out movement of object 62 causes the beat pattern to translate either one way or the other across the Moire pattern. Once again, limited fractional contour interval information is obtained because of the small area used for analyzing the intensity information.

A third detection technique is the phase-shifting technique common to interferometric measurement and used with Moire topography. This technique is described in detail in U.S. Pat. No. 4,794,550 [issued to J. E. Greivenkamp (one of the inventors herein) on Dec. 27, 1988] which uses a system arrangement similar to that of system 10 of present FIG. 1. However, in the patented system, either the projection grating (corresponding to the first grating 18 of present FIG. 1) or the sensor (which is an image sensing array of a camera located at second grating 34 of the present FIG. 1) is laterally shifted to insert a phase shift in the intensity pattern between the image of the projection grating at the sensing array and the sensing array itself. From the resulting phase-shifted intensity values detected by the image sensor of the camera, a time-varying signal is generated at the output of the image sensing array of the camera. This time varying signal is used by a signal processing means to calculate any change in the surface distance from the previous reading to a small fraction of a contour interval, and also determine the direction of motion. In system 50 of FIG. 2, a similar time-varying signal can be produced by laterally shifting the second grating 56. The major limitation of this phase-shifting technique is that the velocity of the motion of the object or support 62 is limited to a maximum of a half contour interval per measurement period. This third phase-shifting detection technique is the preferred implementation for many applications, and can be used with system 50.

Figure 7:
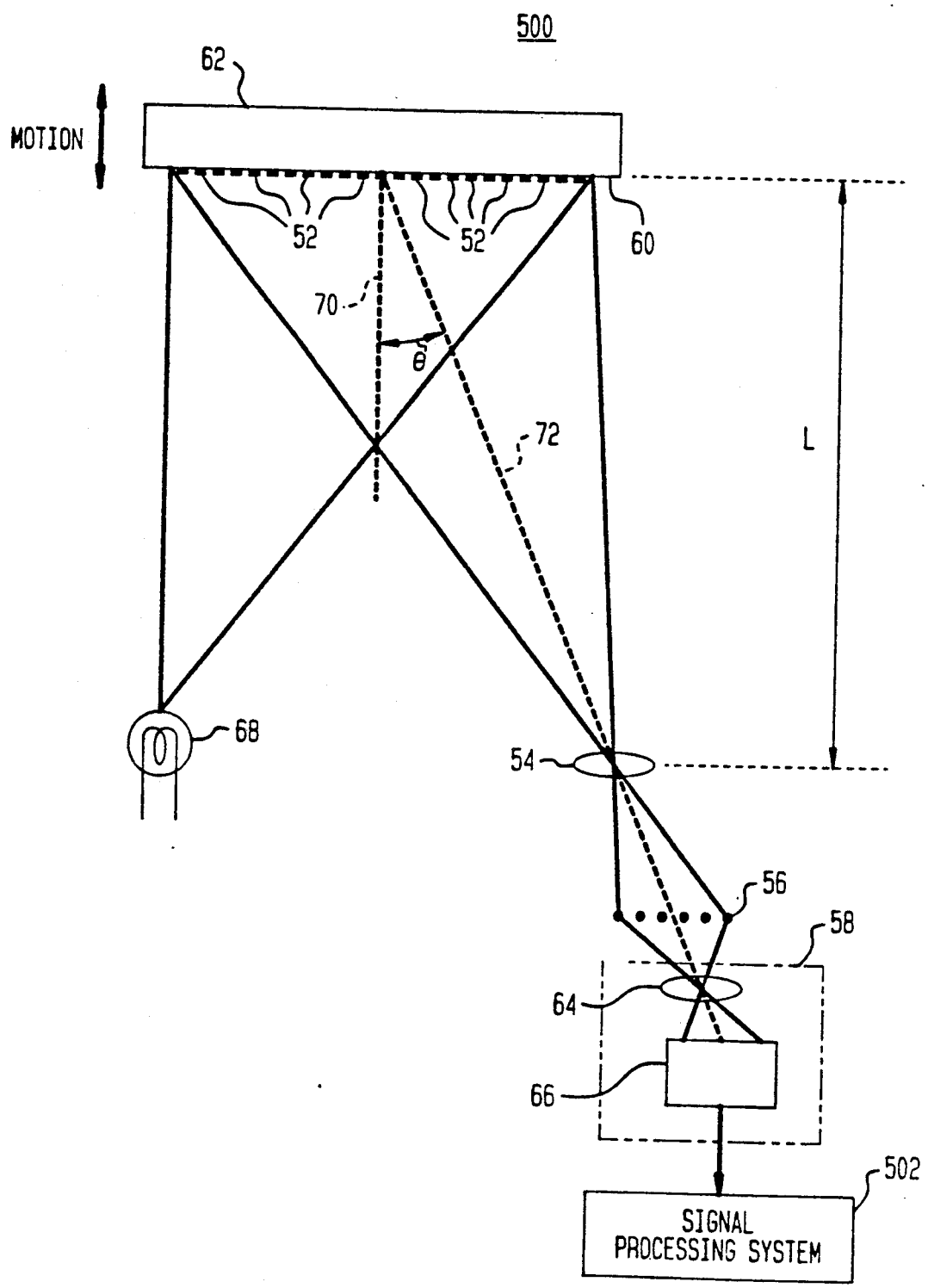
FIG. 7 is a top view of an arrangement similar to FIG. 2 for providing an absolute Moire distance measurement of a diffusely reflective surface in accordance with the present invention.

Referring now to FIG. 7, there is shown an absolute Moire distance measuring system 500 in accordance with the present invention. System 500 is very similar to system 50 of FIG. 2, except that signal processing system 502 functions somewhat differently from the signal processing system 80 of FIG. 2. Signal processing system 502 exploits the changing magnification factor across the field of view for determining absolute distances of the diffusely reflective surface 60 from a reference position. Before describing the present invention, it must be understood that, aside from the fractional contour interval information that is produced by the above-described phase-shifting detection technique (or other detection technique) between sample periods, the primary displacement information comes from counting the number of times the measured intensity at a point behind the second grating 56 goes through a periodic change using the signal processing system 80 of FIG. 2. This count gives the displacement in contour intervals from an initial position. The directional information relating to the movement of the surface being measured comes from the combination of the measured phase (0 to 360 degrees corresponding to a contour interval of travel) of the intensity signal obtained from the phase-shifting technique, and the requirement that the maximum amount of travel that occurs between measurements is less than a half period. A phase change between readings of 0° to 180° indicates a motion in one direction, and a phase change between readings of 180° to 360° indicates motion in the other direction. Which of these directions is positive or negative depends on the actual configuration and sign conventions used in system 50. The directional information for any of the non-phase-shifting techniques is derived from the direction of motion of the Moire pattern between measurements. Information about position of the surface being measured is lost, however, if the count of the number of contour intervals of displacement is lost or wrong. Therefore, the systems 10 of FIG. 1 and 50 of FIG. 2 described hereinbefore are "relative" and not "absolute" Moire distance measurement systems.

In order to turn the relative distance measuring system 50 of FIG. 2 into an absolute distance measuring system 500 of FIG. 7, the system 50 must be converted from what is basically a fringe or intensity-cycle counting system. More particularly, other information must be derived from the data obtained from the Moire pattern which permits an independent determination of the number of contour intervals that have passed. In system 500 of FIG. 7, the mismatch of magnification between the image of the first grating 52 and the second grating 56 is used to provide an absolute displacement measurement in accordance with the present invention. As will be described hereinafter, this magnification mismatch leads to the generation of data that is proportional to the displacement of the diffusely reflective surface 60 from the reference position. Measuring this magnification mismatch produces an independent source of displacement data that is not dependent on the counting of contour intervals. The present absolute Moire distance measuring system 500 takes advantage of the magnification mismatch effects to gain additional function from the system.

From Equation (2), if $L_0$ is defined as the reference position of the object or support 62 to produce a match between the image of the first grating 52 and the second grating 56 (the reference position for the system of FIG. 2), then the reference position magnification $m_0$ is $$m_0 = (L_0 - f)/f, \qquad (7)$$

and the period $P_0$ of the first grating 52 is $$P_0 = m_0 P, \qquad (8)$$

The distance "d" is now defined to be the displacement of the diffusely reflective surface 60 from this reference position (a positive "d" indicates the surface 60 is closer to the lens 54), and the location L of the object or support 60 is defined by the equation $$L = L_0 - d. \qquad (9)$$

The optical magnification "m" in equation (2) can be rewritten as $$m = (L_0 - d - f)/f = m_0 - d/f. \qquad (10)$$

The period P' of the image of first grating 52 that falls on the second grating 54 is then $$P' = P_0/m. \qquad (11)$$

At this point, the mathematics is simplified if grating frequencies (the inverses of the periods) are used instead of the periods of the first and second grating 52 and 56 and the image of the first grating. Therefore, hereinafter F is defined as the frequency of the second grating, $F_0$ is the frequency of the first grating, and F' is the frequency of the image of the first grating on the second grating as defined by the equation $$F' = mF_0 = (m_0 - d/f)F_0. \qquad (12)$$

Simplification results from the realization that $(m_0)(F_0) = F$ (the reference or matched condition) so that:

$$F' = F - (d/f)(F/m_0), \qquad (13)$$

or, reusing Equation (7), $$F' = F - d F/(L_0 - f). \qquad (14)$$

The beat frequency $\delta F$, or difference, between the image of the first grating 52 and the second grating 56 is then $$\delta F = F - F' = d F/(L_0 - f), \qquad (15)$$

$$\delta F \approx d F/L_0. \qquad (16)$$

This approximation is valid for values of $L_0$ much larger than the focal length of the lens 54. It should be noted that the above derivation assumes that the lens 54 has been continuously refocused on the diffusely reflective surface 60 as it moves. This assumption is valid for large values of $L_0$, and the exact calculation can be performed. The error results from a non-linearity in Equation (15), and such error is small for a maximum displacement distance "d" much less than L. This error, however, can be compensated for in a calibration procedure.

The image that is transmitted through the second grating 56 to the detector means 58 is a low-frequency beat pattern with a beat frequency $\delta F$ which is measured in the plane of the second grating 56. There are at least two methods for using this beat frequency $\delta F$ to produce an absolute Moire distance measurement. The first method uses the measured beat frequency $\delta F$ to directly infer the distance "d" from Equation (16). This type of measurement will generally have a low resolution in measured displacement distance.

The second method combines a measurement of the beat frequency $\delta F$ with the fractional contour interval information produced by one of the hereinbefore described techniques such as phase-shifting, to produce a high precision system, but with a large unambiguous measurement range (no need to count contour intervals). One way of considering this latter type of system is that precision over a range of a contour interval is obtained from the phase-shifting operation, and the beat frequency $\delta F$ information is used to determine where the object or support 62 is within a number of one or more contour intervals. Since there is no requirement to count the passing of contour intervals, a system using this second method is an absolute Moire distance measuring (AMDM) system, and several implementations are described hereinafter.

Another way to think about the phase-shifting implementation is that it produces a first measurement of the position of the object or support 62 modulo C (a number between 0 and C). What is not known is the number of full contour intervals that must be added to this first measurement to get the actual displacement of the object or support 62 from its reference position. In "relative" distance measuring systems, this number is derived by counting contour intervals, and uninterrupted data collection is required. In system 500, to obtain the absolute Moire distance measurement in accordance with the present invention, a second measurement of distance is obtained to determine this contour interval number. This second distance measurement needs to only provide the overall position of the object or support 62 from the reference position to within $\pm C/2$. The number of contour intervals is, therefore, determined and added to the first measurement, and a high-precision reading results. The changing beat frequency $\delta F$ provides such a second measure.

A first detection implementation in accordance with the present invention uses system 500 of FIG. 7. The Moire pattern is imaged onto a linear or area detector array 66. The output signal from the detector array 66 is analyzed to determine the beat frequency $\delta F$, and the distance "d" is calculated from Equation (16). The direction of displacement from the reference position (the matched position) is found by noting the direction of motion of the beat pattern across the detector array 66 as the object or support 62 moves. This system is, therefore, only "half" absolute since there is an ambiguity in the beat frequency δF for positive and negative displacements. This ambiguity can be removed by constraining the object or support 62 to only one side of the matched or reference position, or equivalently by placing this reference position at or beyond the limit of travel of the object or support 62.

Figure 4:
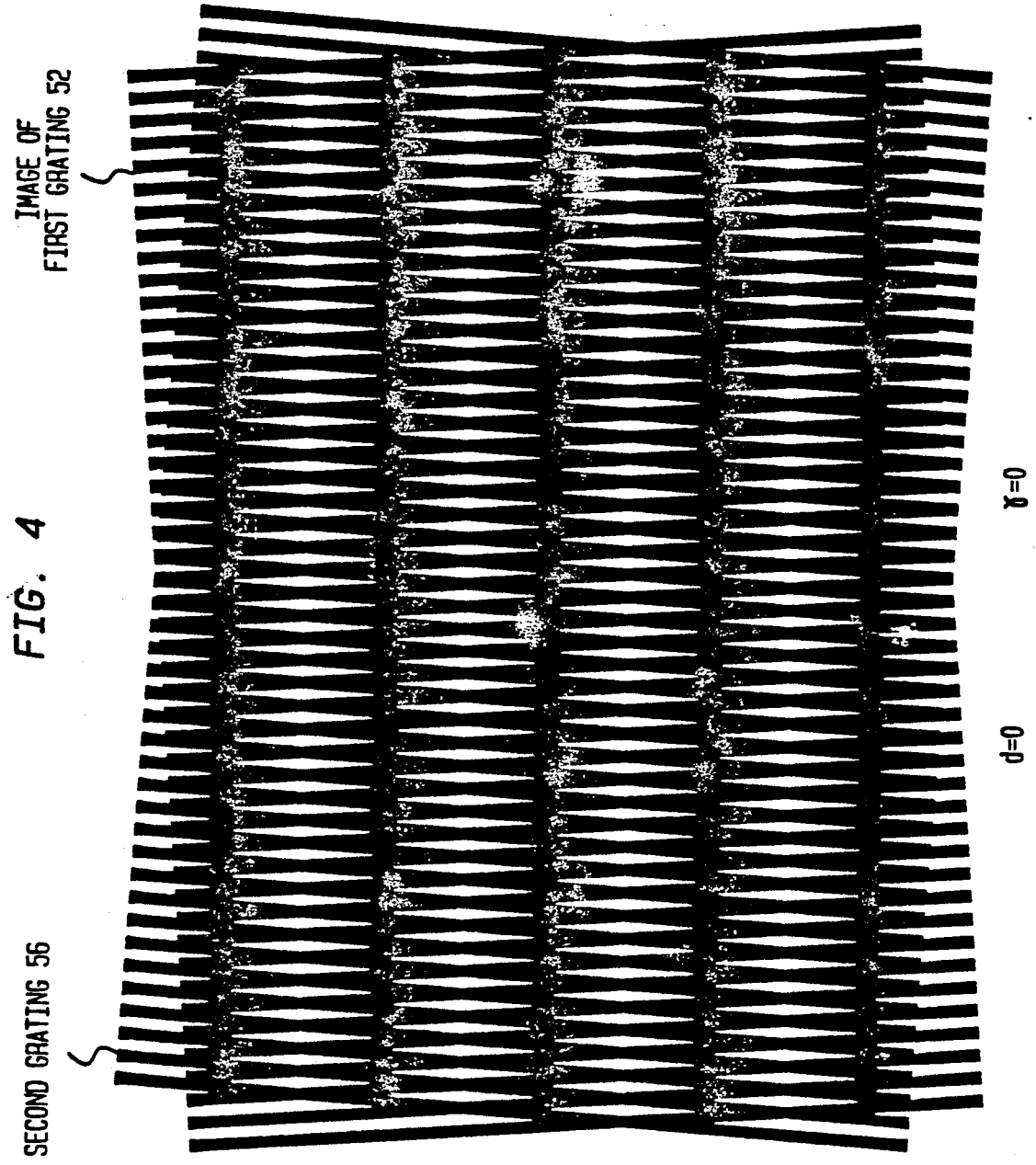
FIG. 4 is an exemplary Moire pattern produced by the image of the first grating superimposed on, and matched to the period of, the second grating, in the arrangement of FIG. 2, when the first and second gratings are tilted with respect to one another, and the diffusely reflective surface is located at a reference distance L from the viewing lens.
Figure 5:
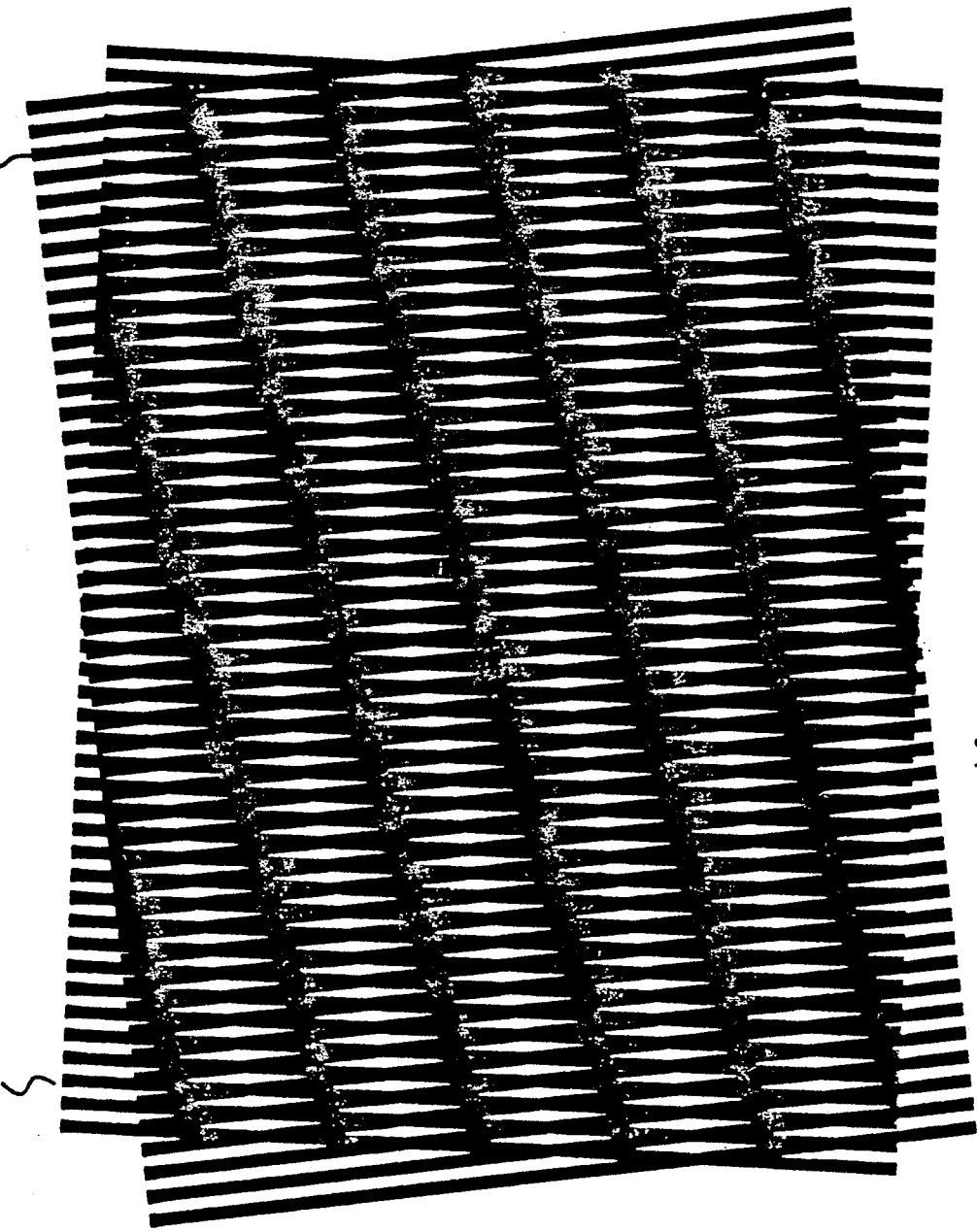
FIG. 5 is an exemplary Moire pattern, similar to FIG. 4, produced by the image of the first grating superimposed on the second grating when the first and second gratings are tilted with respect to one another, and the diffusely reflective surface is located at a distance to the viewing lens which is less than the reference distance.
Figure 6:
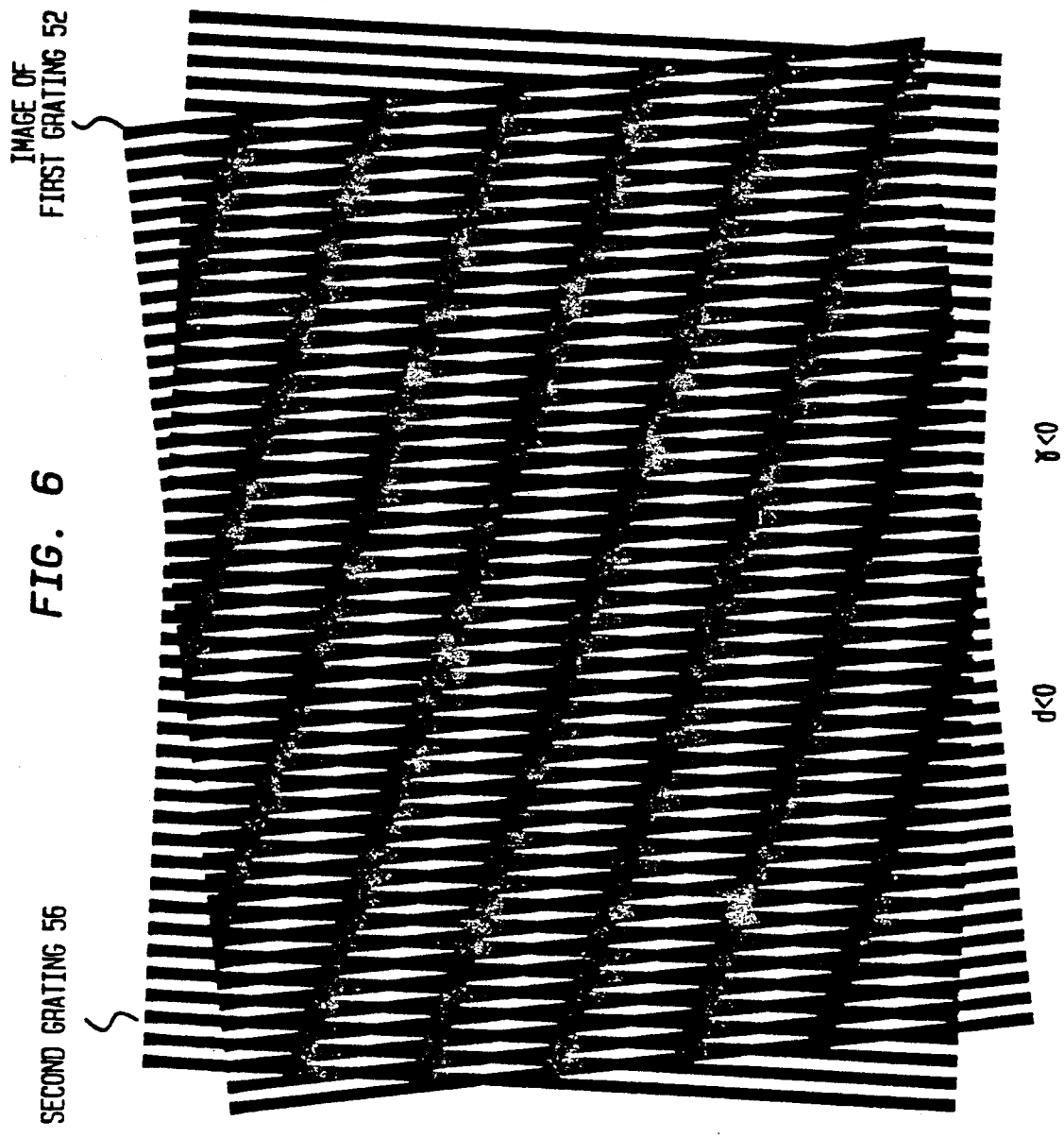
FIG. 6 is an exemplary Moire pattern, similar to FIG. 4, produced by the image of the first grating superimposed on the second grating when the first and second gratings are tilted with respect to one another, and the diffusely reflective surface is located at a distance to the viewing lens which is greater than the reference distance.

A second detection implementation in accordance with the present invention, which is a preferred embodiment and uses system 500, removes completely the directional ambiguity of the first detection implementation. In the second detection implementation, a horizontal (perpendicular to the Moire beat pattern generated by the displacement) carrier Moire pattern is introduced by tilting the first grating 52 and the second grating 56 slightly with respect to each other. As the vertical Moire beat pattern is generated by the displacement of the object or support 62, the net Moire pattern appears to rotate as shown in FIGS. 4, 5, and 6. The angle of rotation indicates the distance from the reference position $L_0$, and the rotation direction gives the sign of the distance to the reference position. If the first and second gratings 52 and 56 are rotated through angles of $\pm \beta$, the frequency $F_C$ of the horizontal lines forming the carrier moire pattern is defined by the equation $$F_C = 2F_X \tan \beta, \quad (17)$$

where $F_X$ is the frequency of the second grating 56 along the horizontal direction, and $$F_X = F \cos \beta. \quad (18)$$

With the first and second gratings 52 and 56 rotated, the beat frequency δF of the vertical lines formed by the distance-dependent Moire (Equation (16)) is $$\delta F = d F_X / L. \quad (19)$$

The resulting combination Moire pattern is the sum of these two orthogonal patterns, and the net frequency is found by taking the vector sum of these two frequencies. The net Moire pattern is oriented at an angle τ with respect to the horizontal, and is defined by the equation $$\tan \tau = d / (2L_0 \tan \beta). \quad (20)$$

The rotation angle τ encodes the distance "d" from the reference position, and the sign of the rotation gives the direction of displacement. There is an approximation in the derivation of Equation (20). As the object or support 62 moves from the reference position, the frequency of the carrier fringes $F_C$ also changes, but for small tilt angles, this change is much smaller than the change in δF and can be ignored. The above result is diagrammed in FIGS. 4, 5 and 6.

Referring now to FIG. 4, there is shown a resulting Moire pattern produced when the diffusely reflective surface 60 is at the reference position $L_0$. In FIG. 4, the Moire pattern is horizontal, and the beat frequency δF in the Moire pattern is zero.

Referring now to FIGS. 5 and 6, FIG. 5 shows a Moire pattern that is produced when the object or support 62 is displaced inside the reference position (positive d). In the Moire pattern of FIG. 5, the frequency F' of the image of the first grating 52 [Equation (14)] is less than that of the viewing grating (which has a larger period), and the Moire pattern is rotated in a counterclockwise (positive) direction. FIG. 6, on the other hand, shows the Moire pattern produced when the object or support 62 is displaced outside the reference position. In FIG. 6, the image frequency of the first grating 52 is higher (the period is lower) than that of the second grating 56, and the Moire pattern is rotated in a clockwise (negative) direction which is opposite from the Moire pattern of FIG. 5. The change between FIGS. 4, 5 and 6 is a small change in the horizontal size of the image of the first grating 52. It is to be understood that the amount of Moire pattern rotation for a particular displacement can also be changed by varying the tilt angles of the first and second gratings 52 and 56, and that the direction of the Moire fringe rotation will change if the tilt angles of the first and second gratings are reversed.

To implement the fringe rotation concept of the second detection implementation in system 500, the Moire pattern is imaged onto an area array 66, such as a CCD array, and image processing in the signal processing system 502 at the output of detector means 58 determines the rotation angle. The distance "d" is then be calculated by inverting Equation (20) to arrive at:

$$d = 2L_0 \tan \tau \tan \beta. \quad (21)$$

The precision of this second detection implementation is determined by the precision to which the fringe angle is measured between the Moire patterns of the first and second gratings 52 and 56, and provides a true absolute Moire distance measuring system 500.

Referring now to FIG. 8, there is shown a flow diagram of the sequence used by the signal processing system 502 of FIG. 7 for processing the second detection implementation just discussed. In FIG. 8, the Moire pattern is imaged onto the two-dimensional (area) detector array 66 as indicated in block 100. The signal processing means 502 digitizes the detector array 66 output signal (e.g., the Moire pattern similar to one of FIGS. 4-6) and stores such digitized Moire pattern signal in a computer memory as indicated in block 101. In other words, each of the pixels of the detector array 66 provide an intensity value which is digitized and stored in an associated location in the computer memory. From the digitized Moire pattern stored in memory, the software of the computer fits lines through the centers of the digitized Moire fringes (points of maximum intensity having, for example, a maximum digital value) as indicated in block 102. Having determined the centers of the digitized Moire fringes, the angle τ of these fitted lines with respect to the horizontal is calculated as indicated in block 103. Having determined the rotation angle τ, the computer of the signal processing system 502 calculates the absolute distance of the object or support 62 from the reference position using Equation (21) as indicated in block 104. It is to be understood that certain elements as, for example, the distance $L_0$ (distance from the lens to the reference position), and the angle β (the relative grating rotation) are known from the hardware configuration of FIG. 7 and stored in the computer memory.

A third detection implementation in accordance with the present invention uses system 500 and adds the phase-shifting technique, described above, to the first detection implementation of determining the beat frequency δF and calculating the distance "d" from Equation (16). In this third detection implementation, the second grating 56 is laterally shifted by means (not shown) to introduce a time-varying pattern that is monitored by a single detector means 58, such as a photodetector. The detected beat pattern is analyzed by the signal processing means (not shown) to determine the number of contour intervals that the object or support 62 is displaced from the reference position. The precision of the measurement is increased by the addition of the phase-shifting method, but directional ambiguity remains.

A fourth detection implementation in accordance with the present invention, which is also a preferred embodiment and uses system 500, is to add the phase shifting technique to the second detection implementation. In this fourth detection implementation, the second grating 56 is laterally shifted by means (not shown) to introduce a time-varying pattern that is monitored by detector means 58 using a single detector such as a photodetector. The resulting output signal from the single detector is used by the signal processing means 502 to give a high-precision reading of where the object or support 62 is located within a contour interval, and the rotation angle τ of the net pattern (as shown in FIGS. 4, 5 and 6) provides a specific number of contour intervals. As with the second detection implementation, the fourth detection implementation provides a true absolute Moire distance measuring system 500.

Referring now to FIG. 9, there is shown a flow diagram of a sequence used by the signal processing system 502 of FIG. 7 for processing the fourth detection implementation just discussed. Since the fourth detection implementation adds the phase shifting technique to the second detection implementation, blocks 100, 101, 102, 103 and 104 of FIG. 9 correspond to the same numbered blocks for performing the second detection implementation as shown in FIG. 8. After performing the steps of blocks 100-104, the absolute displacement of object 62 determined in block 104 is converted to a number of contour intervals by dividing by C (which is known from the hardware configuration) and choosing the integer N closest to this result as indicated in block 105. Meanwhile, the second grating 56 is laterally shifted as indicated in block 200. At a location on the detector array 66, a photodetector measures the time varying intensity in the Moire pattern resulting from the shifting of the second grating as indicated in block 201. The resulting signal from the photodetector is analyzed using a phase shifting algorithm as described, for example, in U.S. Pat. No. 4,794,550 mentioned hereinbefore for the second method for using the beat frequency as indicated in block 202. The output from the analysis occuring for block 202 is the displacement d1 of the object or support 62 within a contour interval C which is between $-C/2$ and $+C/2$, to provide a high resolution measurement. As indicated in block 203, the number of integer contour intervals from block 105 and the precise value of the displacement within a contour interval from the block 202 are added to obtain the absolute displacement of the object or support 62 from the reference position $L_0$.

It is to be understood that any of the above described four detection implementations can be made into a fifth detection implementation (which also uses system 500) by replacing the second grating 56 with a the detector array 66 comprising a plurality of spaced pixels. With such system 500, the Moire is formed between the spaced pixels of the detector array 66 and the image of the first grating 52. The Moire fringes appear in an electronic output signal from detector array 66. Depending on the detection signal processing system, either a linear or an area array 66 is used. The pixel spacing in the Moire direction should equal the line period of the second grating 56 that is being replaced by the detector array 66.

A sixth detection implementation in accordance with the present invention uses system 500 and two or more discrete detector means 58 to increase the effective contour interval, and permits the system 500 to have a large unambiguous measurement range (no need to count contour intervals). This technique is similar to a Two-Wavelength Phase-Shifting Interferometry technique described in the article by K. Creath et al. in *Optical Acta*, Vol. 32, 1985 at page 1455, which is a method used to extend the measurement range of interferometers for measuring aspheric wavefronts. If the amount of possible object or support 62 movement is restricted to plus or minus half a contour interval or less, then any one of the Moire distance measuring systems of the prior art and FIGS. 1 and 2 will provide "absolute" distance information. In other words, there are no contour intervals to count. Unfortunately, for most of these systems, the contour interval is too small to produce an absolute distance measuring system of any value, and the number of contour intervals that have passed must be determined for practical use. If the contour interval is increased in size, this restriction may not apply, and this is the goal of the sixth detection implementation.

In the sixth detection implementation in accordance with the present invention, if two discrete spaced-apart detectors are placed behind the second grating 56, each detector has a different field angle of view and, therefore, a different contour interval as described by Equation (6) and shown in FIG. 3. Using a detection technique that provides fractional contour interval information at each detector, such as phase shifting, a given displacement "d" of the object or support 62 is measured by the two detectors to give the following results:

$$d = mC_1 + \delta C_1 \quad (22)$$

and $$d = nC_2 + \delta C_2, \quad (23)$$

where m and n are unknown integers, and $\delta C_1$ and $\delta C_2$ are the fractional contour interval information from the first and second detectors, respectively. Equations (22) and (23) can be solved for "d" if the maximum value of "d" is restricted to plus or minus half the effective contour interval $C'$, where, from the above-mentioned K. Creath et al. article $$C' = |C_1 C_2/(C_1 - C_2)|. \quad (24)$$

Another viewpoint of this result is that there is only one solution for "d" within the range interval $\pm C'/2$ that will satisfy both Equations (22) and (23).

Since the use of multiple detectors in the sixth detection implementation results in an increased unambiguous measurement range, this detection implementation is able to serve as an absolute distance measurement system 500 for certain applications. There are also solutions using more than two detectors, and these systems generally have effective contour intervals that are increased in size over the two detector solution. One important advantage of the sixth detection implementation over the use of a standard Moire system with the equivalent large contour interval, is measurement precision. The use of multiple detectors maintains the measurement precision that is inherent in either of the single detector measurements (a fraction of $C_1$ or $C_2$), as opposed to this same fraction of the larger single contour interval.

It is to be understood that the specific embodiments described herein are intended merely to be illustrative of the spirit and scope of the invention. Modifications can readily be made by those skilled in the art consistent with the principles of this invention. For example, there is no strict requirement on the quality of the first grating 52, and the first grating 52 can be printed on stickers and placed on the object or support 62 as the need arises. For monitoring parts in production, the first grating 52 could be molded into the part or placed on the part as a step in some other manufacturing process. Still further, at the output of the detector means 58, any suitable signal processing system can be used such as a system similar to that disclosed in U.S. Pat. No. 4,794,550 issued to J. E. Greivenkamp on Dec. 27, 1988. More particularly, a computer is programmed to analyze the information occurring in the output signal of the detector means 58 for implementing any one of the hereinbefore described techniques and detection implementations. The computer can dynamically determine the absolute distance "d" and direction of the displacement of the diffusely reflective surface 60 from the reference position and, if necessary, add such absolute displacement to the reference distance $L_0$ for determining the overall absolute distance measurement between the surface 60 and the lens 54. It is to be further understood that flowcharts similar to FIGS. 8 and 9 can be easily produced by those skilled in the art for each of the first, third, fifth and sixth detection implementations using the descriptions provided hereinbefore.

Having thus described our invention, what we claim as new and desire to secure letters Patent is:

1. A method of providing absolute Moire distance measurements comprising the steps of:
   (a) locating, forming, or printing a first grating on a diffusely reflective surface;
   (b) forming an image of the first grating on a second grating with an imaging means for generating a Moire pattern formed by the product of a pattern of the image of the first grating and a pattern of the second grating; and
   (c) detecting a difference in magnification between the pattern of the image of the first grating and the pattern of the second grating as the diffusely reflective surface moves normal to a plane thereof for generating information related to the absolute distance of the diffusely reflective surface from a reference position.

2. The method of claim 1 wherein in step (b), arranging an optical axis of the imaging means at a predetermined acute angle with respect to a line normal to the diffusely reflective surface.

3. The method of claim 1 wherein the second grating has a predetermined period, and in step (b) performing the substeps of:
   (b1) forming the image of the first grating with a period that matches the period of the second grating when the diffusely reflective surface is located at the reference distance from the imaging means; and
   (b2) forming the image of the first grating with a period that does not match the period of the second grating when the diffusely reflective surface is not at the reference position, whereby a magnification mismatch is produced in the Moire pattern between the pattern of the image of the first grating and the pattern of the second grating for measuring a displacement of the diffusely reflective surface from the reference position.

4. The method of claim 3 wherein in step (c) performing the substeps of:
   (c1) detecting the difference in magnification by measuring a first frequency of the image of the first grating and a second frequency of the second grating,
   (c2) determining a beat frequency by taking the difference between the first and second frequencies detected in step (c1); and
   (c3) determining the displacement of the diffusely reflective surface from the reference position using the beat frequency determined in step (c2).

5. The method of claim 4 wherein in step (c) performing the additional substeps of:
   (c4) constraining the movement of the diffusely reflective surface to only one side of the reference position; and
   (c5) determining the absolute distance of the diffusely reflective surface from the imaging means by adding the displacement determined in step (c3), using a predetermined sign that is dependent on the side of constrained movement in step (c4).

6. The method of claim 4 wherein in step (c) performing the additional substeps of:
   (c4) detecting a direction of motion of the beat frequency from the beat frequency detected at the reference position using a linear or area detector array for determining a direction of displacement of the diffusely reflective surface; and
   (c5) determining the absolute distance of the diffusely reflective surface from the reference position by adding the displacement determined in step (c3), using a sign therefor that is dependent on the direction of displacement determined in step (c4).

7. The method of claim 6 wherein in step (b) a detector array comprising spaced pixel replaces the second grating, and the Moire pattern is formed between the spaced pixels and the image of the first grating.

8. The method of claim 4 wherein:
   in steps (b1) and (b2) temporally translating the second grating; and
   in step (c) performing the additional substeps of:
   (c4) detecting a time varying signal at the output of a single detector which is introduced by the temporal translation of the second grating;
   (c5) analyzing the time varying signal to determine a first measurement of where within a contour interval the diffusely reflective surface is displaced from the reference position; and
   (c6) determining the absolute distance of the diffusely reflective surface from the reference position by adding the first measurement obtained in step (c5), and a specific number of contour intervals determined in step (c3).

9. The method of claim 8 wherein in step (b) the second grating is replaced by a detector array comprising spaced pixel, and the Moire pattern is formed between the spaced pixels and the image of the first grating.

10. The method of claim 3 wherein:
in step (b) tilting the first and second gratings with respect to each other for producing a net Moire pattern which is the sum of a carrier Moire pattern in a first direction, and a Moire beat pattern which is generated orthogonal to the carrier Moire pattern when the diffusely reflective surface is displaced from the reference position, the net Moire pattern being caused to rotate through a predetermined angle of rotation which is dependent on a predetermined displacement of the diffusely reflective surface from the reference position; and
in step (c) performing the substep of:
(c1) detecting the difference in magnification by detecting the angle of rotation of the net Moire pattern as the diffusely reflective surface is moved from the reference position for generating a measurement of the displacement of the diffusely reflective surface from the reference position.

11. The method of claim 10 wherein in step (b) the second grating is replaced by a detector array comprising spaced pixel, and the Moire pattern is formed between the spaced pixels and the image of the first grating.

12. The method of claim 10 wherein in step (c) performing the additional substeps of:
(c2) determining a direction of the displacement of the diffusely reflective surface from the reference position by detecting a direction of rotation of the net Moire pattern; and
(c3) determining the absolute distance of the diffusely reflective surface from the reference position obtained in step (c1), using a sign therefor that is dependent on the direction of displacement determined in step (c2).

13. The method of claim 12 wherein in step (b) the second grating is replaced by a detector array comprising spaced pixel, and the Moire pattern is formed between the spaced pixels and the image of the first grating.

14. The method of claim 10 wherein in step (c1) the rotation angle is used to provide a specific number of contour intervals of the displacement, and step (c) comprises the additional substeps of:
(c2) temporally translating the second grating;
(c3) detecting a time varying signal at the output of a single detector which is introduced by the temporal translation of the second grating;
(c4) analyzing the time varying signal to determine a first measurement of where within a contour interval that the diffusely reflective surface is displaced from the reference position; and
(c5) determining the absolute distance of the diffusely reflective surface from the reference position by adding the first measurement obtained in step (c4), and a specific number of contour intervals determined from the angle of rotation determined in step (c1).

15. The method of claim 14 wherein in step (b) the second grating is replaced by a detector array comprising spaced pixel, and the Moire pattern is formed between the spaced pixels of the detector array and the image of the first grating.

16. The method of claim 3 wherein:
the maximum amount of the displacement of the diffusely reflective surface from the reference position is one-half of a contour interval;
in substeps (b1) and (b2), locating a plurality of optical detectors at spaced-apart locations behind the second grating, each optical detector measuring a light intensity in the Moire pattern and having associated therewith a separate contour interval which is dependent on the location of the optical detector in the Moire pattern; and
in step (c) performing the substeps of:
(c1) determining a fractional contour interval representing a displacement within the one-half contour interval maximum displacement of the diffusely reflective surface from the reference position for each optical detector during a predetermined sampling period; and
(c2) determining the absolute distance of the diffusely reflective surface from the reference position by generating an effective contour interval which is a function of the fractional contour intervals determined at at least two of the optical detectors.

17. Absolute Moire distance measurement apparatus comprising:
a first grating which is located, formed, or printed on a diffusely reflective surface to be measured;
a second grating;
imaging means for forming an image of the first grating on the second grating to generate a Moire pattern formed by the product of a first pattern of the image of the first grating and a second pattern of the second grating;
optical detecting means for detecting a difference in magnification between the first pattern of the image of the first grating and the second pattern of the second grating of the Moire pattern as the diffusely reflective surface moves normal to the plane thereof and generating an output signal representative of such difference in magnification; and
information generating means, responsive to the output signal from the optical detecting means, for generating information related to the absolute distance of the diffusely reflective surface from a reference position.

18. The Moire distance measurement apparatus of claim 17 wherein an optical axis of the imaging means is arranged at a predetermined acute angle with respect to a line normal to the diffusely reflective surface.

19. The Moire distance measurement apparatus of claim 17 wherein:
the first grating comprises opaque and non-opaque parallel lines or areas with a first predetermined period therebetween; and
the second grating comprises opaque and non-opaque parallel lines or areas with a second predetermined period that matches the period of the image of the first grating when the imaging means is located at a reference distance from the diffusely reflective surface, and does not match the period of the image of the first grating when the diffusely reflective surface moves from the reference distance, whereby a magnification mismatch occurs that manifests itself as a spatially varying intensity pattern caused by the Moire between a pattern of the image of the first grating and a pattern of the second grating.

20. The Moire distance measurement apparatus of claim 17 wherein the information generating means comprises:

detecting means for detecting a first frequency of the image of the first grating and a second frequency of the second grating in the output signal of the optical detecting means;

measuring means for measuring a beat frequency by taking the difference between the first and second frequencies; and determining means for determining the displacement of the diffusely reflective surface from the reference position using the beat frequency.

21. The Moire distance measurement apparatus of claim 20 wherein:

the movement of the diffusely reflective surface is constrained to only one side of the reference position; and the information generating means further comprises distance determining means for determining the absolute distance of the diffusely reflective surface from the reference position by using a predetermined sign that is dependent on the one side used for the constrained movement along with the displacement determined by the determining means.

22. The Moire distance measurement apparatus of claim 21 wherein the second grating of the optical detecting means is replaced by a detector array comprising spaced pixel, and the Moire pattern is formed between the spaced pixels and the image of the first grating.

23. The Moire distance measurement apparatus of claim 20 wherein:

the second grating is temporally translated; and the optical detecting means comprises a single optical detector for detecting a time varying signal introduced by the temporal translation of the second grating and generating an output signal representative of the time varying signal; and the information generating means comprises:

analyzing means for analyzing the time varying signal output signal from the optical detecting means to determine a first measurement of where within a contour interval the diffusely reflective surface is displaced from the reference position, and adding means for adding the first measurement determined by the analyzing means and a second measurement representative of a number of contour intervals displaced by the diffusely reflective surface to obtain an absolute distance measurement of the diffusely reflective surface from the reference position.

24. The Moire distance measurement apparatus of claim 23 wherein the second grating of the optical detecting means is replaced by a detector array comprising spaced pixel, and the Moire pattern is formed between the spaced pixels and the image of the first grating.

25. The Moire distance measurement apparatus of claim 19 wherein:

the first and second gratings are tilted with respect to each other for producing a net Moire pattern which is the sum of a carrier Moire pattern in a first direction, and a Moire beat pattern which is generated orthogonal to the carrier Moire pattern when the diffusely reflective surface is displaced from the reference position, the net Moire pattern being caused to rotate through a predetermined angle of rotation which is dependent on a predetermined displacement of the diffusely reflective surface from the reference position; and the optical detecting means comprises detector means for detecting the difference in magnification by determining the angle of rotation of the net Moire pattern as the diffusely reflective surface is moved from the reference position for generating a measurement of the displacement of the diffusely reflective surface from the reference position.

26. The Moire distance measurement apparatus of claim 25 wherein the second grating is replaced by a detector array comprising spaced pixel, and the Moire pattern is formed between the spaced pixels and the image of the first grating.

27. The Moire distance measurement apparatus of claim 25 wherein:

the information generating means comprises:

determining means for determining a direction of the displacement measurement generated by the optical detecting means by detecting a direction of rotation of the net Moire pattern; and adding means for providing a measurement of the absolute distance of the diffusely reflective surface from the reference position by using a sign that is dependent on the direction of displacement determined by the determining means with the measurement of the displacement of the diffusely reflective surface from the reference position provided by the optical detecting means.

28. The Moire distance measurement apparatus of claim 27 wherein the second grating is replaced by a detector array comprising spaced pixel, and the Moire pattern is formed between the spaced pixels and the image of the first grating.

29. The Moire distance measurement apparatus of claim 25 wherein the apparatus further comprises:

means for temporally translating the second grating; and the optical detecting means comprises a detector for detecting a time varying signal which is introduced by the temporal translation of the second grating and generating an output signal representative of the time varying signal; and the information generating means comprises:

generating means, responsive to the rotation angle of the Moire pattern detected by the optical detecting means, for generating a value for a specific number of contour intervals of the displacement, analyzing means for analyzing the time varying output signal from the detector to determine a first measurement of where within a contour interval that the diffusely reflective surface is displaced from the reference position, and determining means for determining the absolute distance of the diffusely reflective surface from the reference position by adding the first measurement from the analyzing means and the specific number of contour intervals generated by the generating means.

30. The Moire distance measurement apparatus of claim 19 wherein:

the maximum amount of the displacement of the diffusely reflective surface from the reference position is one-half of a contour interval; and the optical detecting means comprises a plurality of optical detectors at spaced-apart locations behind the second grating, each optical detector measuring a light intensity in the Moire pattern and generating an output signal representative of the measured light intensity; and the information generating means comprises measuring means responsive to the output signal from each of the optical detectors and using a separate contour interval for each optical detector which is dependent on its location in the Moire pattern, for providing a separate fractional contour interval measurement representing a displacement within the maximum one-half contour interval displacement of the diffusely reflective surface from the reference position for each optical detector during a predetermined sampling period and generating an output signal;

generating means responsive to each output signal from the measuring means for generating an effective contour interval distance which is a function of the fractional contour intervals determined at at least two of the optical detectors; and adding means for determining the absolute distance of the diffusely reflective surface from the reference position using the effective contour interval distance determined by the generating means.

* * * * *